(12) United States Patent
Okada

(10) Patent No.: US 10,914,595 B2
(45) Date of Patent: Feb. 9, 2021

(54) MAP INFORMATION PROVIDING APPARATUS, PORTABLE MAP TRANSMITTING APPARATUS, MAP INFORMATION PROVIDING SYSTEM, MAP INFORMATION PROVIDING METHOD, AND PROGRAM

(71) Applicant: CASIO COMPUTER CO., LTD., Tokyo (JP)

(72) Inventor: Takeshi Okada, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 221 days.

(21) Appl. No.: 16/139,184

(22) Filed: Sep. 24, 2018

(65) Prior Publication Data

US 2019/0094029 A1 Mar. 28, 2019

(30) Foreign Application Priority Data

Sep. 26, 2017 (JP) ................. 2017-185275

(51) Int. Cl.
*G01C 21/32* (2006.01)
*G01C 21/36* (2006.01)
*H04W 4/48* (2018.01)
*H04W 4/80* (2018.01)
*G08G 1/0968* (2006.01)
(Continued)

(52) U.S. Cl.
CPC ......... *G01C 21/32* (2013.01); *G01C 21/3661* (2013.01); *G01C 21/3667* (2013.01);
(Continued)

(58) Field of Classification Search
CPC .... G01C 21/32; G01C 21/3661; G01C 21/30; G01C 21/36; G01C 21/3605;
(Continued)

(56) References Cited

U.S. PATENT DOCUMENTS

2012/0316777 A1* 12/2012 Kitta .................. G01C 21/3661
701/431
2016/0258772 A1* 9/2016 Chang .................. H04W 4/026
(Continued)

FOREIGN PATENT DOCUMENTS

JP H01-142899 A 6/1989
JP 2000-180197 A 6/2000
(Continued)

OTHER PUBLICATIONS

Notification of Reasons for Refusal dated Dec. 3, 2019 in Japanese Patent Application No. 2017-185275.

*Primary Examiner* — Redhwan K Mawari

(74) *Attorney, Agent, or Firm* — Scully Scott Murphy & Presser

(57) ABSTRACT

A map information providing apparatus and method are provided. Second map information of a second map range is acquired from an external apparatus having first map information of a first map range. A portable map transmitting apparatus having third map information of a third map range is communicated with the map information providing apparatus. The third map range is wider than the second map range. The second map range is narrower than the first map range. It is determined whether it is possible to provide predetermined map information corresponding to predetermined position information based on the second map information to the map information providing apparatus. If so, communication with the portable map transmitting apparatus is controlled to receive the third map information. The second map information is updated based on the third map information and the predetermined map information is acquired from the updated second map information.

19 Claims, 10 Drawing Sheets

(51) Int. Cl.
  *G06F 16/29* (2019.01)
  *H04W 4/02* (2018.01)
  *H04W 4/50* (2018.01)
  *H04W 12/00* (2021.01)

(52) U.S. Cl.
  CPC ......... *G01C 21/3688* (2013.01); *G06F 16/29* (2019.01); *G08G 1/096883* (2013.01); *H04W 4/02* (2013.01); *H04W 4/48* (2018.02); *H04W 4/50* (2018.02); *H04W 4/80* (2018.02); *H04W 12/003* (2019.01)

(58) Field of Classification Search
  CPC ............... G01C 21/3667; G01C 21/3688; G01C 21/20; H04W 4/024
  See application file for complete search history.

(56) References Cited

U.S. PATENT DOCUMENTS

| | | | | |
|---|---|---|---|---|
| 2016/0298975 | A1* | 10/2016 | Kawasaki | G01C 21/3605 |
| 2018/0025235 | A1* | 1/2018 | Fridman | G08G 1/096708 |
| | | | | 382/103 |
| 2018/0245927 | A1* | 8/2018 | Frish | G01C 21/165 |
| 2019/0094029 | A1* | 3/2019 | Okada | G01C 21/32 |

FOREIGN PATENT DOCUMENTS

| | | |
|---|---|---|
| JP | 2000-242165 A | 9/2000 |
| JP | 2008-191102 A | 8/2008 |
| JP | 2016-161378 A | 9/2016 |

\* cited by examiner

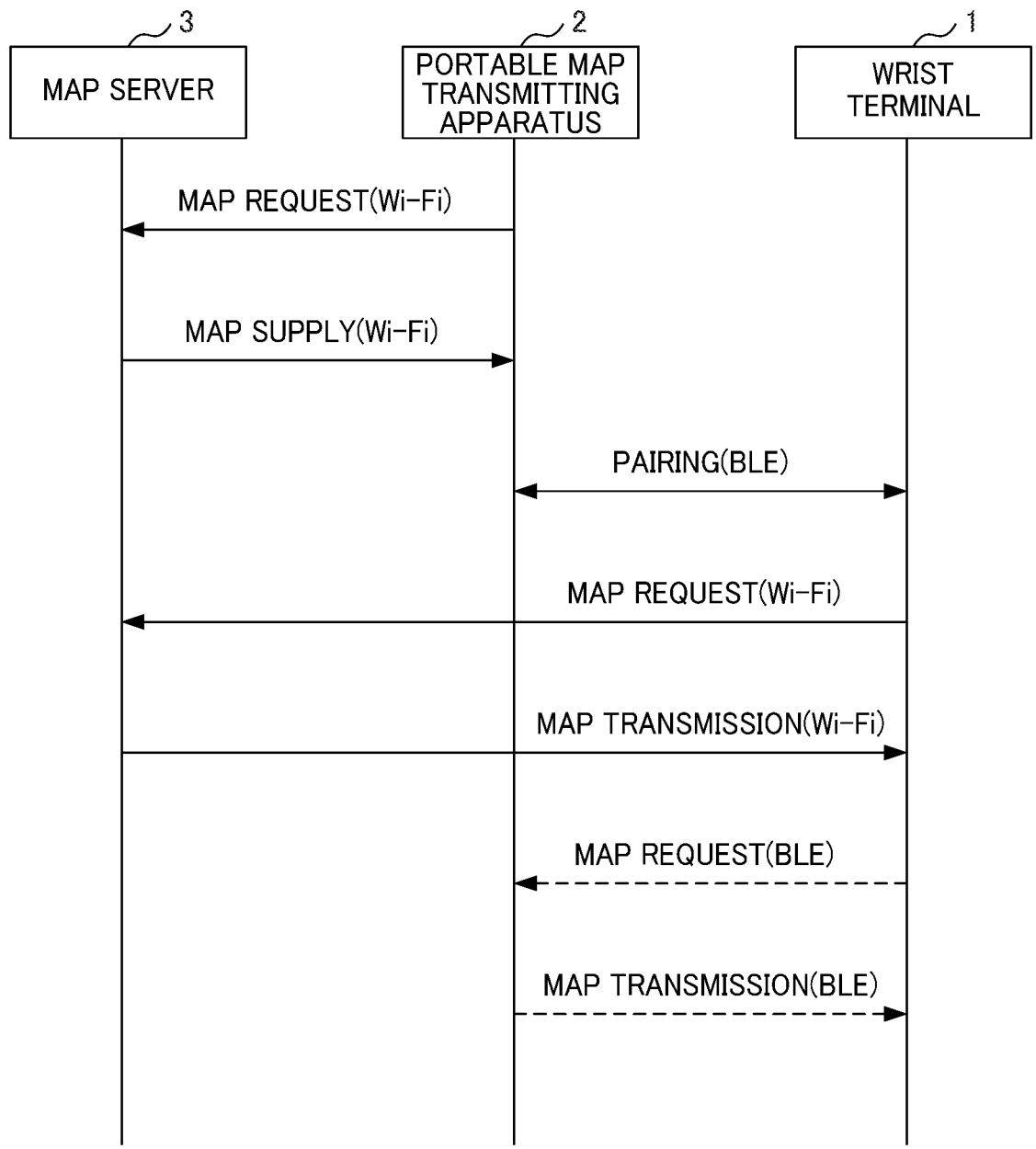

MAP INFORMATION PROVIDING APPARATUS, PORTABLE MAP TRANSMITTING APPARATUS, MAP INFORMATION PROVIDING SYSTEM, MAP INFORMATION PROVIDING METHOD, AND PROGRAM

CROSS-REFERENCE TO RELATED APPLICATIONS

This application is based upon and claims the benefit of priority under 35 USC 119 of Japanese Patent Application No. 2017-185275 filed on Sep. 26, 2017 the entire disclosure of which, including the description, claims, drawings, and abstract, is incorporated herein by reference in its entirety.

BACKGROUND OF THE INVENTION

Field of the Invention

The present invention relates to a map information providing apparatus, a portable map transmitting apparatus, a map information providing system, a map information providing method, and a program.

Related Art

In recent years, portable information terminal devices having various functions have been developed. Some of the portable information terminal devices function as map information providing apparatuses that have map information, in which a range is specified in advance, and provide the map information to users as disclosed in JP 2008-191102 A. When the map information providing apparatus is requested to provide map information outside the displayable map range, the map information providing apparatus acquires the map information from the outside. In order to acquire the map information, communication means based on a telephone line (mobile communication) different from wireless communication means for receiving absolute position information is used.

SUMMARY OF THE INVENTION

One aspect of the embodiment is a map information providing apparatus comprising: a processor; and a memory, wherein the processor executes a program stored in the memory to perform operations comprising: acquiring second map information of a map range, which is narrower than first map information that an external apparatus has, from the external apparatus; communicating with a portable map transmitting apparatus having third map information of a map range wider than the second map information; determining whether or not it is possible to provide predetermined map information corresponding to predetermined position information on the basis of the second map information; controlling communication with the portable map transmitting apparatus so as to receive map information based on the third map information from the portable map transmitting apparatus in a case where it is determined that it is not possible to provide the predetermined map information; and updating the second map information based on the third map information received by communication with the portable map transmitting apparatus.

BRIEF DESCRIPTION OF THE DRAWINGS

FIG. 10 is a sequence chart illustrating another aspect of transmission and reception of map information in the map information providing system.

DETAILED DESCRIPTION OF THE INVENTION

Hereinafter, an embodiment of the invention will be described with reference to the accompanying diagrams.

[Configuration of Map Information Providing System]

Figure 1:
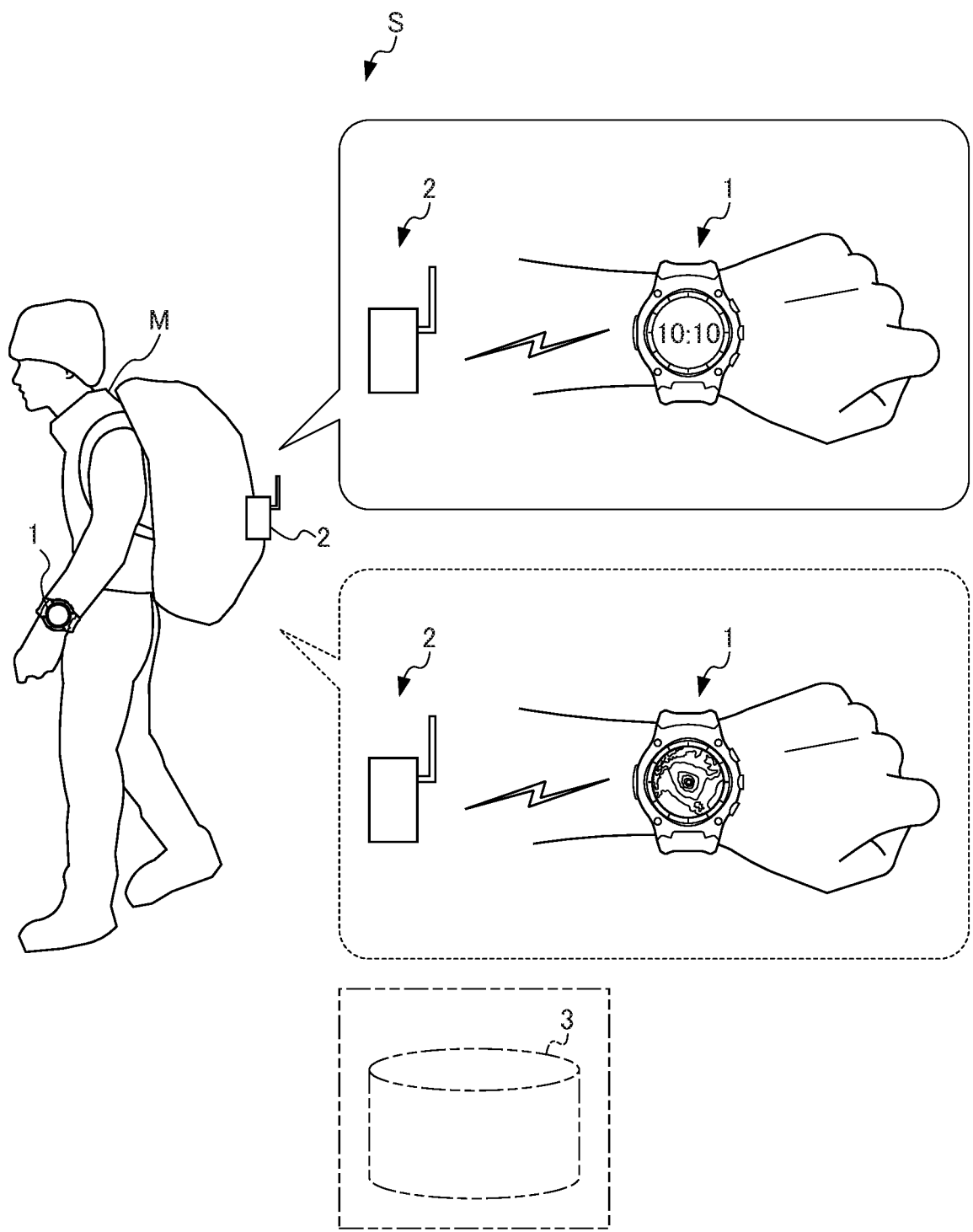
FIG. 1 is a schematic diagram illustrating the configuration of a map information providing system according to an embodiment of the invention.

FIG. 1 is a schematic diagram illustrating the configuration of a map information providing system S according to an embodiment of the invention. In FIG. 1, the map information providing system S includes a wrist terminal 1, a portable map transmitting apparatus 2, and a map server 3 that is an external apparatus with respect to the wrist terminal 1 and the portable map transmitting apparatus 2. The map server 3 holds the first map information of a relatively wide map range in its own storage unit. The map range of the first map information includes, for example, the entire world, and the first map information is map information with various scales relevant to the map range. The wrist terminal 1 holds the second map information of a map range narrower than the map range of the first map information. The map range of the second map information is, for example, any region in a specific country, or a further subdivided region.

The portable map transmitting apparatus 2 holds the third map information of a map range, which is wider than the map range of the second map information and within the map range of the first map information, in its own apparatus. The map range of the third map information is, for example, a specific country or any region in a specific country. In FIG. 1, a climber M who is the user wears the wrist terminal 1 as a map information providing apparatus according to an embodiment of the invention on the left wrist, and the portable map transmitting apparatus 2 according to an embodiment of the invention is installed in a rucksack that is carried on the back.

The wrist terminal 1 and the portable map transmitting apparatus 2 are configured to be able to communicate with each other by Bluetooth low energy/Bluetooth LE (trademark) (hereinafter, referred to as "BLE"). In the normal state, the wrist terminal 1 and the portable map transmitting apparatus 2 perform communication by BLE. In addition, the wrist terminal 1 and the portable map transmitting apparatus 2 are also configured to be able to communicate with each other by the AP mode of Wireless Fidelity (Wi-Fi). At the time of communication in the AP mode, the portable map transmitting apparatus 2 functions as an access point in the infrastructure mode. The portable map transmitting apparatus 2 can also be connected to the map server 3 on the Internet through Wi-Fi.

The wrist terminal 1 has a clock function. Accordingly, in a normal state in which there is no operation from the user M, the wrist terminal 1 digitally displays the time on a display unit 14 as illustrated in a balloon by the solid line in FIG. 1. On the other hand, when the wrist terminal 1 receives a map display request operation from the user M, in a case where the map information of the range held in the wrist terminal 1 conforms to the display request, the wrist terminal 1 displays the map on the display unit 14 on the basis of the held map information.

On the other hand, in a case where the wrist terminal 1 does not hold the map information of the range conforming to the display request, the wrist terminal 1 receives the map information of the range conforming to the display request from the portable map transmitting apparatus 2 and updates the initially held map information. The wrist terminal 1 displays a map on the display unit 14 on the basis of the map information updated in this manner. In the balloon illustrated by the broken line in FIG. 1, a state in which a map is displayed on the display unit 14 is illustrated. The portable map transmitting apparatus 2 side downloads map information for supply to the wrist terminal 1 from the map server 3 and holds the map information.

Downloading of the map information from the portable map transmitting apparatus 2 to the wrist terminal 1 is performed in the AP mode of the Wi-Fi as described above. Therefore, the user who owns the portable map transmitting apparatus 2 together with the wrist terminal 1 can update the map information in the wrist terminal 1 without trouble even in an environment in which connection to other mobile communication networks is difficult or impossible, such as a high land.

In addition, the portable map transmitting apparatus 2 may take the form of downloading and acquiring the map information from the map server 3. However, the portable map transmitting apparatus 2 is not limited to this form. In a case where another apparatus acquires the map information from the map server 3 and stores the map information in a removable medium, the portable map transmitting apparatus 2 may take the form of holding the map information by attaching the removable medium or a removable medium storing a copy of the map information to the portable map transmitting apparatus 2.

In addition, the wrist terminal 1 updates the map information held in the wrist terminal 1 itself to information of a predetermined map range centered on the position of the wrist terminal 1 on the basis of the acquired GPS position information. The updating of the map information in this case is executed as a background job for display processing of the map according to the operation from the user.

The map range of the second map information held in the wrist terminal 1 itself is limited, but the portable map transmitting apparatus 2 side holds the third map information over a wider range than the map range of the second map information. The portable map transmitting apparatus 2 transmits map information corresponding to the map range of the second map information in the third map information to the wrist terminal 1 at a predetermined timing when there is a transmission request.

[Hardware Configuration of Wrist Terminal]

Figure 2:
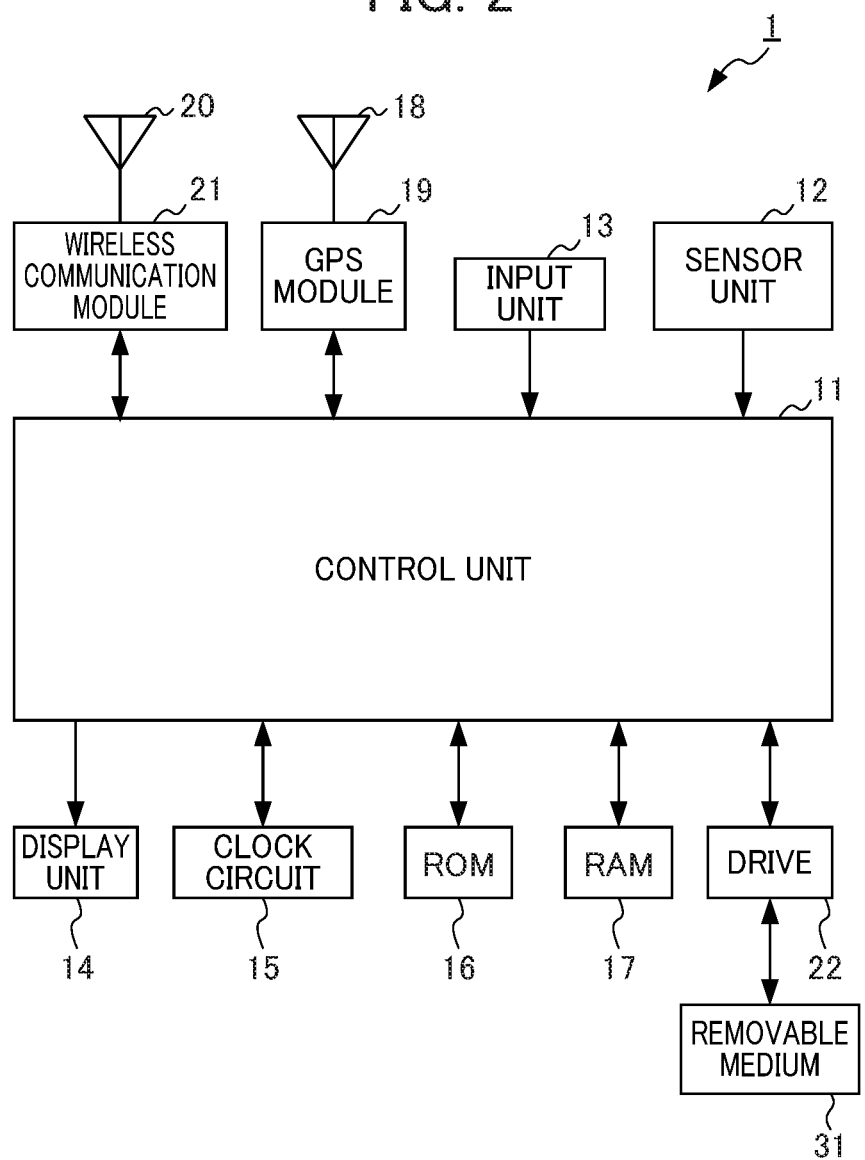
FIG. 2 is a block diagram illustrating the hardware configuration of a map information providing apparatus according to an embodiment of the invention.

FIG. 2 is a block diagram illustrating the hardware configuration of a wrist terminal as the map information providing apparatus according to the embodiment of the invention. The wrist terminal 1 is a device that is configured as a wristwatch type and has a function similar to a smartphone. As illustrated in FIG. 2, the wrist terminal 1 includes a control unit 11, a sensor unit 12, an input unit 13, the display unit 14 including a liquid crystal display (LCD) indicator, a clock circuit 15, a read only memory (ROM) 16, a random access memory (RAM) 17, a global positioning system (GPS) antenna 18, a GPS module 19, a wireless communication antenna 20, a wireless communication module 21, and a drive 22. In addition, the wrist terminal 1 can appropriately include other kinds of hardware, such as an image capture unit.

The control unit 11 is an arithmetic processing unit, such as a central processing unit (CPU), and performs overall control of the operation of the wrist terminal 1. For example, the control unit 11 executes various kinds of processing according to a program recorded in the ROM 16, such as a program for map acquisition and display processing. The sensor unit 12 includes various sensors, such as an acceleration rate sensor, a gyro sensor, an atmospheric pressure sensor, a geomagnetic sensor, and an altitude sensor. The acceleration rate sensor detects acceleration rates in three-axial directions in the wrist terminal 1, and outputs information indicating the detected acceleration rates to the control unit 11. The gyro sensor detects angular rates in three-axial directions in the wrist terminal 1, and outputs information indicating the detected angular rates to the control unit 11. The atmospheric pressure sensor detects atmospheric pressure under the environment in which the wrist terminal 1 is present, and outputs information indicating the detected atmospheric pressure to the control unit 11. The wrist terminal 1 detects the altitude of the wrist terminal 1 on the basis of the information output from the atmospheric pressure sensor.

The input unit 13 is configured to include various buttons, capacitance type or resistance film type position input sensors stacked in the display region of the display unit 14 that is an LCD display unit, and the like, and is used to input various kinds of information according to the user's instruction operation. The display unit 14 outputs a map according to an instruction from the control unit 11. In addition, the display unit 14 displays various images other than the map or a screen for user interface. In the present embodiment, a position input sensor of the input unit 13 is superimposed on the display unit 14 to form a touch panel. The clock circuit 15 generates a time signal from a signal generated by a system clock or an oscillator, and outputs the current time.

The ROM 16 stores information, such as a control program executed by the control unit 11. The RAM 17 provides a work area when the control unit 11 executes various kinds of processing. The GPS antenna 18 receives radio waves transmitted from the satellite in the GPS, converts the radio waves into an electric signal, and outputs the converted electric signal (hereinafter, referred to as a "GPS signal") to the GPS module 19. The GPS module 19 detects the position (latitude, longitude, and altitude) of the wrist terminal 1 and the current time indicated by the GPS on the basis of the GPS signal input from the GPS antenna 18. In addition, the GPS module 19 outputs information indicating the detected position and current time to the control unit 11.

The wireless communication antenna 20 is an antenna capable of receiving radio waves of a frequency corresponding to wireless communications used by the wireless communication module 21. For example, the wireless communication antenna 20 is a loop antenna or a rod antenna. The wireless communication antenna 20 transmits the electric signal of the wireless communication input through the wireless communication module 21 as electromagnetic waves, or converts the received electromagnetic waves into an electric signal and outputs the electric signal to the wireless communication module 21. The wireless communication module 21 transmits a signal to another apparatus through the wireless communication antenna 20 according to an instruction from the control unit 11. In addition, the wireless communication module 21 receives a signal transmitted from another apparatus, and outputs information indicated by the received signal to the control unit 11. The wireless communications used by the wireless communication antenna 20 and the wireless communication module 21 are communication based on the above-described BLE and communication based on the above-described Wi-Fi. These communications are performed under the control of the control unit 11. A removable medium 31, such as a magnetic disk, an optical disk, a magneto-optical disk, or a semiconductor memory, is appropriately mounted on the drive 22. The removable medium 31 can store various kinds of data, such as position and altitude data.

[Hardware Configuration of Portable Map Transmitting Apparatus]

Figure 3:
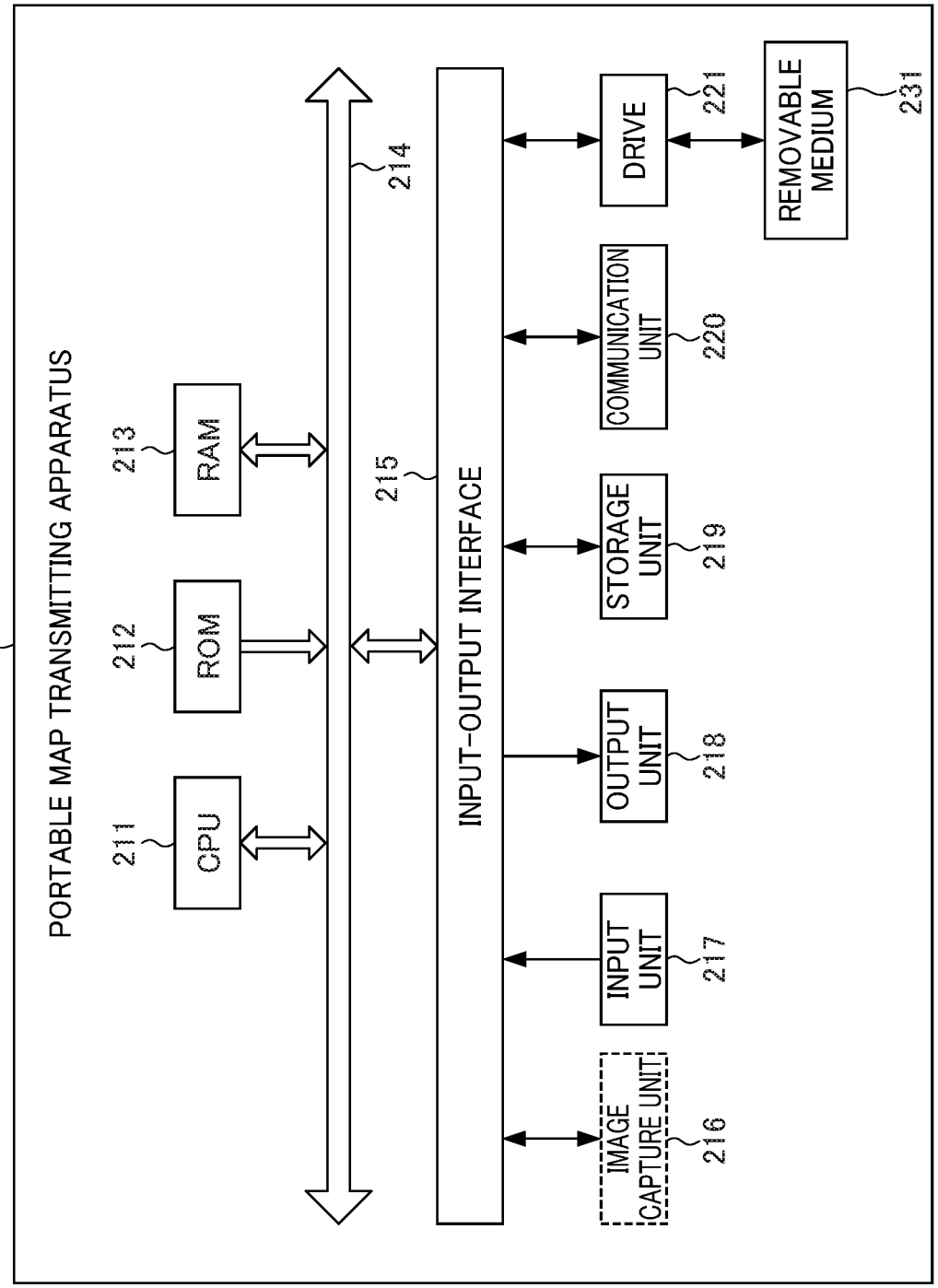
FIG. 3 is a block diagram illustrating the hardware configuration of a portable map transmitting apparatus according to an embodiment of the invention.

FIG. 3 is a block diagram illustrating the hardware configuration of the portable map transmitting apparatus according to the embodiment of the invention. The portable map transmitting apparatus 2 includes a central processing unit (CPU) 211, a read only memory (ROM) 212, a random access memory (RAM) 213, a bus 214, an input-output interface 215, an image capture unit 216, an input unit 217, an output unit 218, a storage unit 219, a communication unit 220, and a drive 221.

The CPU 211 executes various kinds of processing according to a program recorded in the ROM 212 or a program loaded from the storage unit 219 to the RAM 213.

The RAM 213 also appropriately stores data and the like necessary for the CPU 211 to execute various kinds of processing.

The CPU 211, the ROM 212, and the RAM 213 are connected to each other through the bus 214. The input-output interface 215 is also connected to the bus 214. The image capture unit 216, the input unit 217, the output unit 218, the storage unit 219, the communication unit 220, and the drive 221 are connected to the input-output interface 215.

It is not essential to provide the image capture unit 216 in the portable map transmitting apparatus 2 of the present embodiment. The image capture unit is provided when taking a mode such as a smartphone having an image capture function, including the portable map transmitting apparatus of the present embodiment. The image capture unit 216 includes an optical lens unit and an image sensor (not illustrated).

The input unit 217 is configured to include various buttons and the like, and is used to input various kinds of information according to the user's instruction operation. The output unit 218 is configured to include a lamp, a speaker, a vibration motor, or the like, and outputs light, sound, or a vibration signal. The storage unit 219 is formed of a semiconductor memory, such as a dynamic random access memory (DRAM), and stores various kinds of data.

The communication unit 220 controls communication with other apparatuses by direct wireless communication between terminals. In the present embodiment, the communication unit 220 communicates with other apparatuses using BLE (registered trademark), or communicates with the portable map transmitting apparatus 2 or other apparatuses using Wi-Fi. In addition, the portable map transmitting apparatus 2 of the present embodiment communicates with the wrist terminal 1 illustrated in FIGS. 1, 2 and 3 as another apparatus by using the communication unit 220, and transmits captured image data to the wrist terminal 1.

A removable medium 231, such as a magnetic disk, an optical disk, a magneto-optical disk, or a semiconductor memory, is appropriately mounted on the drive 221. The program read from the removable medium 231 by the drive 221 is installed on the storage unit 219 as necessary. In addition, the removable medium 231 can also store various kinds of data, such as image data stored in the storage unit 219, in the same manner as the storage unit 219. In the portable map transmitting apparatus 2 of the present embodiment, the above-described third map information is stored in the removable medium 231 of the drive 221. Storage of the third map information in the removable medium 231 may be performed in such a manner that the portable map transmitting apparatus 2 downloads the third map information from the map server 3 in FIG. 1 through the communication unit 220 to acquire the third map information. In addition, for example, the removable medium 231 in which the third map information is stored in advance by a personal computer or the like may be attached to the drive 221.

[Functional Configuration of Wrist Terminal]

Figure 4:
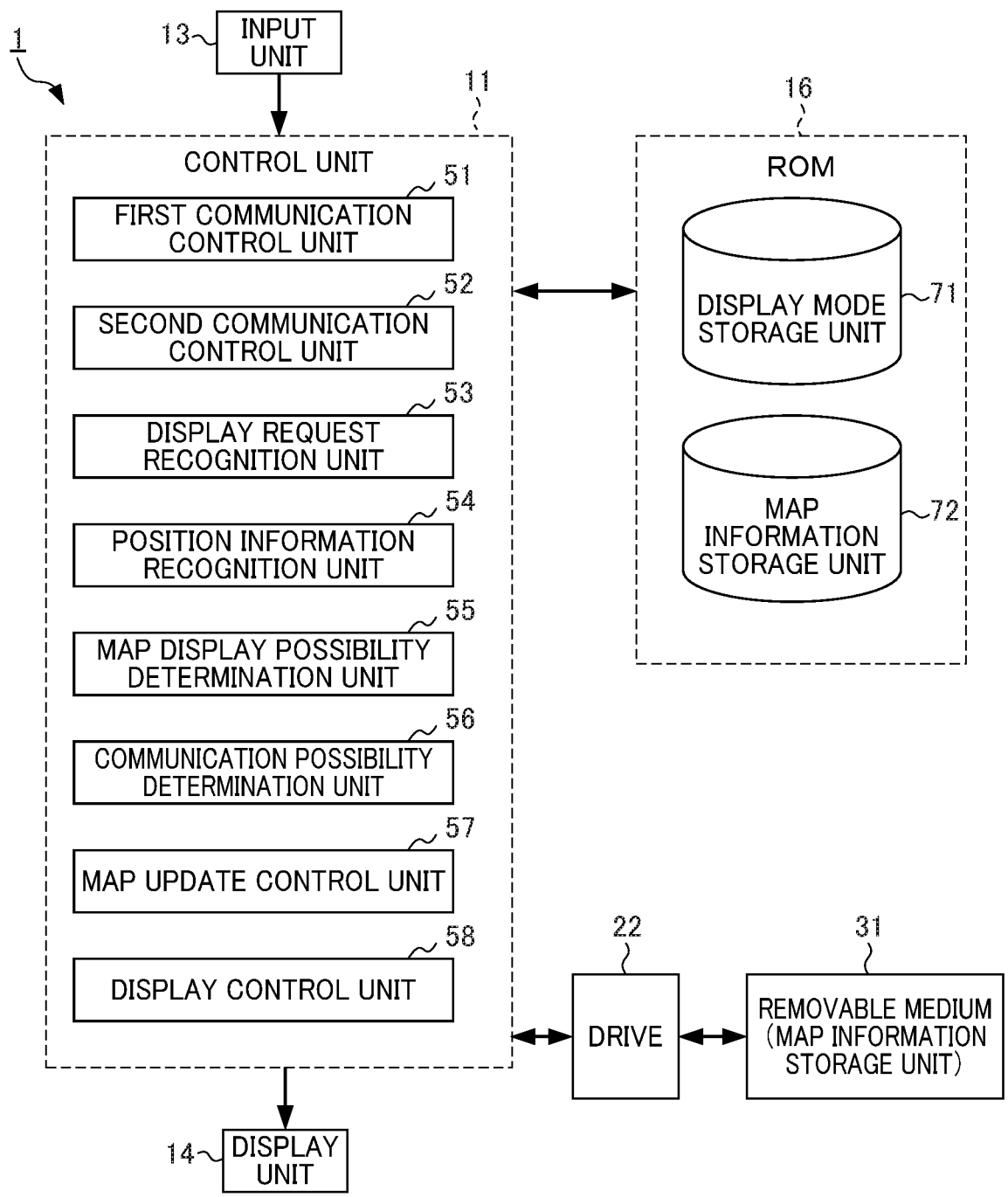
FIG. 4 is a functional block diagram illustrating the functional configuration for executing map acquisition and display processing in a wrist terminal as a map information providing apparatus.

FIG. 4 is a functional block diagram illustrating the functional configuration for executing map acquisition and display processing in a wrist terminal as a map information providing apparatus. The map acquisition and display processing is a series of processes in which the wrist terminal 1 acquires map information to be displayed (that is, to be provided to the user) from the portable map transmitting apparatus 2 and displaying the map information on the display unit 14. In a case where the map acquisition and display processing is executed, as illustrated in FIG. 4, a first communication control unit 51, a second communication control unit 52, a display request recognition unit 53, a position information recognition unit 54, a map display possibility determination unit 55, a communication possibility determination unit 56, a map update control unit 57, and a display control unit 58 in the control unit 11 function. In addition, a display mode storage unit 71 and a map information storage unit 72 are set in one region of the ROM 16.

The first communication control unit 51 controls communication by BLE in the wireless communication module 21 to execute pairing processing or data transmission and reception processing with respect to other apparatuses. The second communication control unit 52 controls communication by Wi-Fi in the wireless communication module 21 to execute data transmission and reception processing with respect to other apparatuses. As described above, in this communication, the AP mode of Wi-Fi can be executed.

The display request recognition unit 53 recognizes a map display request by the user's operation received through the input unit 13. The position information recognition unit 54 recognizes the position information of the wrist terminal 1 on the basis of GPS information acquired through the GPS module 19. The map display possibility determination unit 55 determines whether or not a map range by the user's operation recognized by the display request recognition unit 53 or a predetermined range centered on the current position of the wrist terminal 1 recognized by the position information recognition unit 54 can be displayed on the basis of the map information already stored in the removable medium 31 of the wrist terminal 1. The communication possibility determination unit 56 determines whether or not connection to the Internet through Wi-Fi is possible on the basis of the electric field strength of radio waves received by the antenna 20 and the wireless communication module 21. The map update control unit 57 updates the map information already stored in the removable medium 31 to newly acquired map information. Information for enabling display in various display modes, such as normal two-dimensional display according to the scale or dual screen display with different scales, is stored in the display mode storage unit 71. The map information storage unit 72 stores map information of a range that can be held in the ROM 16 of the wrist terminal 1. The display control unit 58 controls the display of the display unit 14.

[Functional Configuration of Portable Map Transmitting Apparatus]

Figure 5:
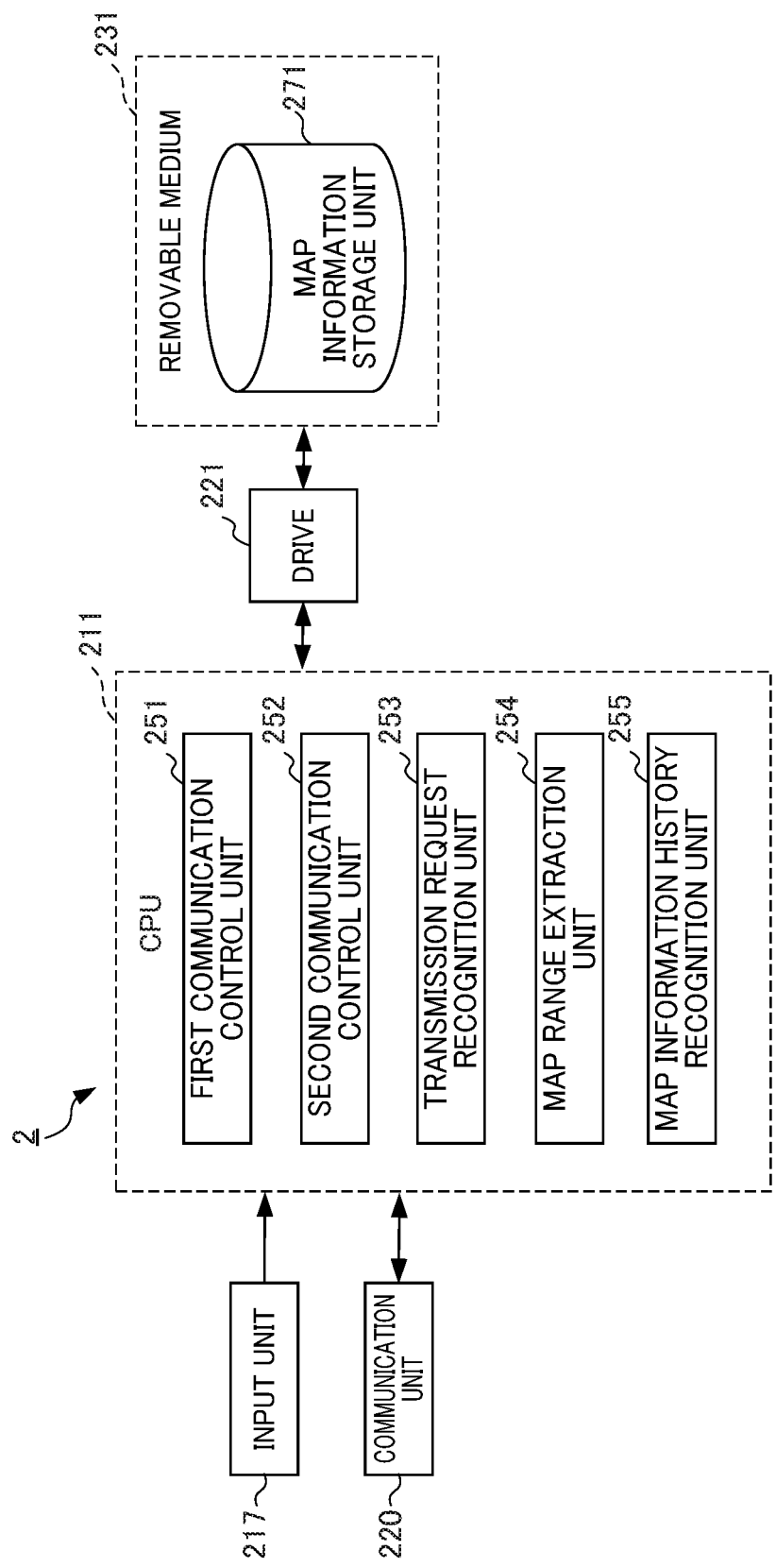
FIG. 5 is a functional block diagram illustrating the functional configuration for executing map transmission processing in a portable map transmitting apparatus.

FIG. 5 is a functional block diagram illustrating the functional configuration for executing map transmission processing in a portable map transmitting apparatus. The map transmission processing is a series of processes for transmitting map information from the portable map transmitting apparatus 2 to the wrist terminal 1 in response to a transmission request from the wrist terminal 1. In a case where the map transmission processing is executed, as illustrated in FIG. 5, a first communication control unit 251, a second communication control unit 252, a transmission request recognition unit 253, a map range extraction unit 254, and a map information history recognition unit 255 in the CPU 211 function. In addition, a map information storage unit 271 is set in one region of the removable medium 231 attached to the drive 221.

The first communication control unit 251 controls communication by BLE in the communication unit 220 to execute pairing processing or data transmission and reception processing with respect to other apparatuses. The second communication control unit 252 controls communication by Wi-Fi in the communication unit 220 to execute data transmission and reception processing with respect to other apparatuses. As described above, in this communication, the AP mode of Wi-Fi can be executed.

The transmission request recognition unit 253 recognizes the presence or absence of a map information transmission request received through the communication unit 220 and the presence or absence of the user's operation to start or end the map transmission operation on the input unit 217. The map range extraction unit 254 extracts a transmission target map range of a map corresponding to the transmission request recognized by the transmission request recognition unit 253. The map range extraction unit 254 transmits the data of the extracted map range to the wrist terminal 1 through the second communication control unit 252. The map information history recognition unit 255 recognizes the history of acquisition and update of map information from the outside. In the map information storage unit 271, the second map information that can be a target of the transmission request from the wrist terminal 1 is stored.

[Operation of Wrist Terminal]

Figure 6:
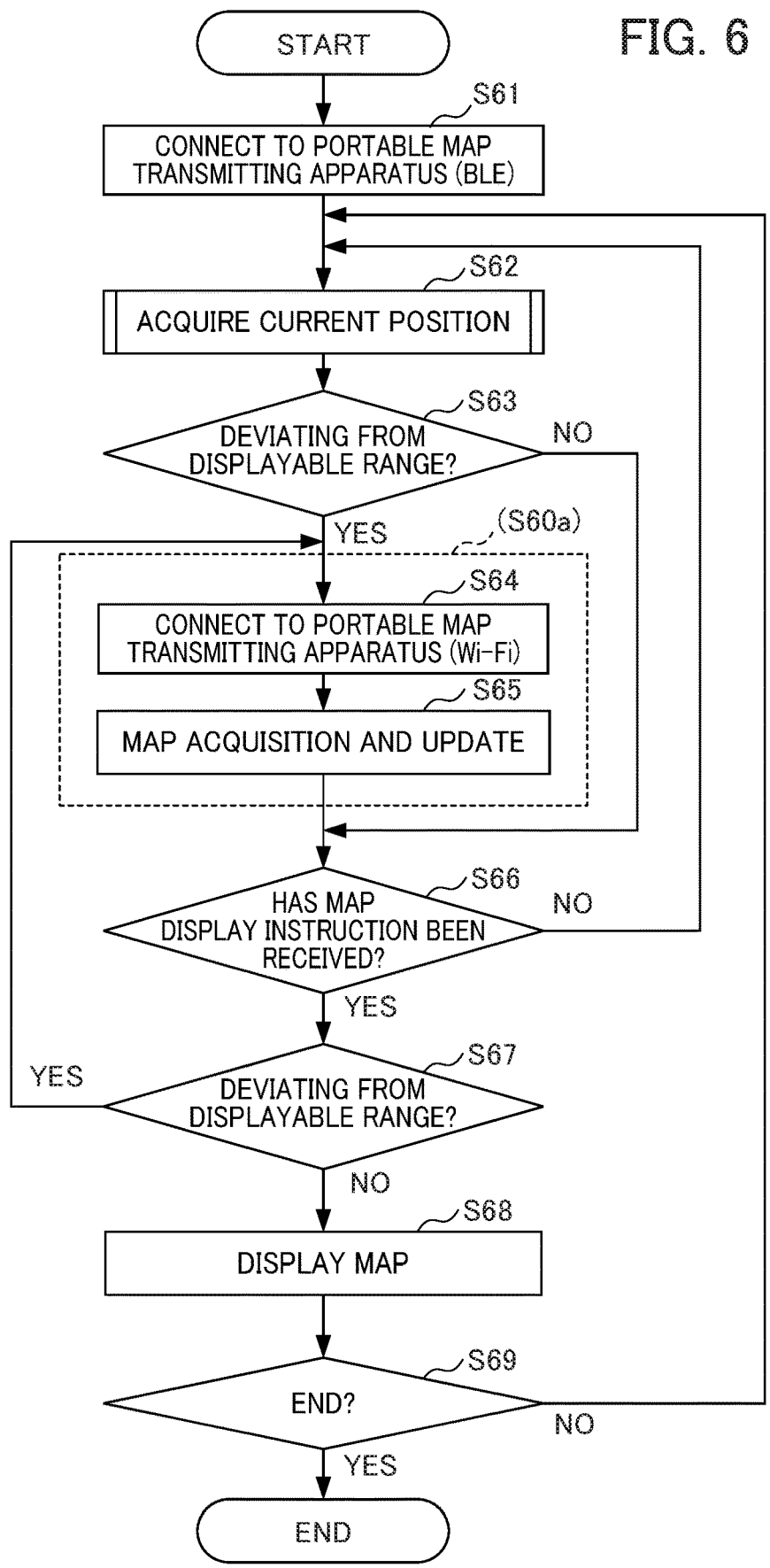
FIG. 6 is a flowchart illustrating the flow of map acquisition and display processing executed by the map information providing apparatus.

Next, the operation of the wrist terminal will be described. FIG. 6 is a flowchart illustrating the flow of map acquisition and display processing executed by the map information providing apparatus. In this case, the map information providing apparatus is the wrist terminal 1, and the map acquisition and display processing is executed by the control unit 11. The map acquisition and display processing is started when a user performs an operation of making a request for map display on the input unit 13 of the wrist terminal 1.

In step S61, the first communication control unit 51 is connected to the portable map transmitting apparatus 2 by BLE. In step S62, the position information recognition unit 54 recognizes the position information of the wrist terminal 1 on the basis of the GPS information acquired through the GPS module 19.

In step S63, the map display possibility determination unit 55 determines whether or not a predetermined range centered on the current position of the wrist terminal 1 recognized by the position information recognition unit 54 can be displayed on the basis of the map information already stored in the removable medium 31 of the wrist terminal 1. That is, it is determined whether or not the predetermined range centered on the current position of the wrist terminal 1 deviates from the map range of the second map information already stored in the removable medium 31. When the map display possibility determination unit 55 determines that the predetermined range centered on the current position of the wrist terminal 1 deviates from the displayable range on the basis of the map information already stored in the removable medium 31 in step S63 (step S63: YES), the process proceeds to step S64. When the map display possibility determination unit 55 determines that the predetermined range centered on the current position of the wrist terminal 1 does not deviate from the displayable range on the basis of the map information already stored in the removable medium 31 in step S63 (step S63: NO), the process proceeds to step S66.

In step S64, the second communication control unit 52 controls communication by Wi-Fi in the wireless communication module 21 to execute data transmission and reception processing with respect to the portable map transmitting apparatus 2. In this communication, the AP mode of Wi-Fi is executed, and a portion corresponding to the second map information of the third map information held in the portable map transmitting apparatus 2 is supplied to the wrist terminal 1. In step S65, the map update control unit 57 updates the map information (second map information) already stored in the removable medium 31 by using the map information supplied from the portable map transmitting apparatus 2 in step S64. In addition, as will be described later, other methods can be adopted for the map acquisition and update processing (step S60a) that is processing for the acquisition of a map from the outside and update processing on the held map in steps S64 and S65.

In step S66, the display request recognition unit 53 determines whether or not there is a map display request by the user's operation received through the input unit 13. When the display request recognition unit 53 determines that there is a map display request in step S66 (step S66: YES), the process proceeds to step S67. When the display request recognition unit 53 determines that there is no map display request in step S66 (step S66: NO), the process proceeds to step S62.

In step S67, the map display possibility determination unit 55 determines whether or not a map range by the user's display request operation recognized by the display request recognition unit 53 can be displayed on the basis of the map information already stored in the removable medium 31 of the wrist terminal 1. That is, it is determined whether or not the map range by the display request operation deviates from the map range of the map information already stored in the removable medium 31. When the map display possibility determination unit 55 determines that the map range by the user's display request operation does not deviate from the map range of the map information already stored in the removable medium 31 of the wrist terminal 1 in step S67 (step S67: NO), the process proceeds to step S68. On the other hand, when the map display possibility determination unit 55 determines that the map range by the user's display request operation deviates from the map range of the map information already stored in the removable medium 31 of the wrist terminal 1 (step S67: YES), the process proceeds to step S64.

In step S68, the display control unit 58 displays the map on the display unit 14. When the display request recognition unit 53 recognizes that a display request end operation has been performed through the input unit 13 in step S69 (step S69: YES), the process is ended. On the other hand, when the display request recognition unit 53 recognizes that no display request end operation has been performed through the input unit 13 (step S69: NO), the process proceeds to step S62.

[Operation of Portable Map Transmitting Apparatus]

Figure 7:
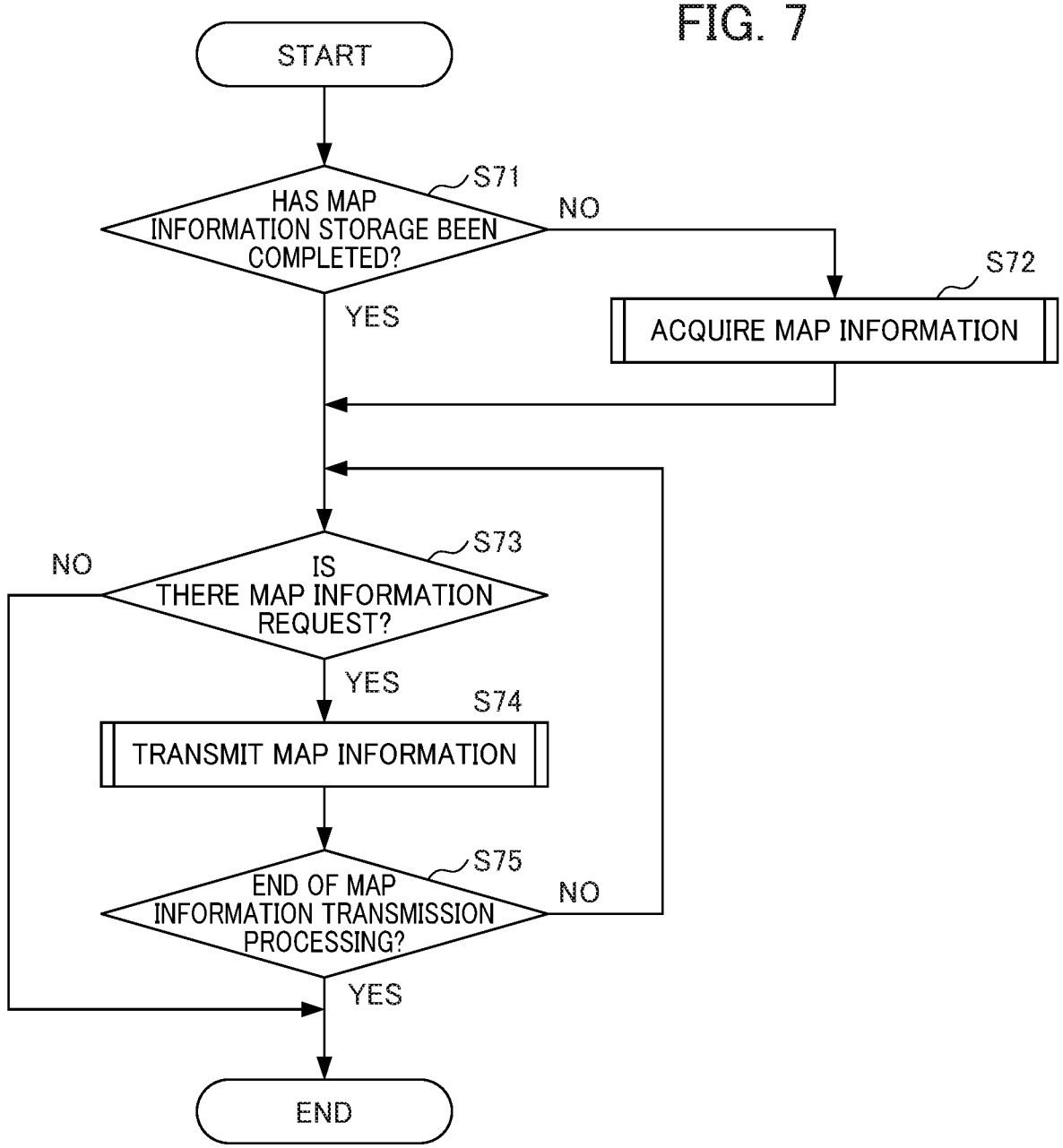
FIG. 7 is a flowchart illustrating the flow of map information transmission processing executed by the portable map transmitting apparatus.

Next, the operation of the portable map transmitting apparatus will be described. FIG. 7 is a flowchart illustrating the flow of map information transmission processing executed by the portable map transmitting apparatus. The map information transmission processing is started on the basis of the user's start operation on the input unit 217.

In step S71, the map information history recognition unit 255 determines whether or not acquisition and update of map information from the outside have already been performed. When the map information history recognition unit 255 determines that the acquisition and update of map information from the outside have not been performed in step S71 (step S71: NO), the process proceeds to step S72. In step S72, the second communication control unit 252 connects to the Internet by Wi-Fi communication in the communication unit 220 to download and acquire map information from the map server 3 (FIG. 1).

In step S73, the transmission request recognition unit 253 recognizes the presence or absence of a map information transmission request received through the communication unit 220. The map information transmission request is received from the wrist terminal 1 having pairing established when communication by BLE in the communication unit 220 is performed under the control of the first communication control unit 251. When the transmission request recognition unit 253 recognizes that the map information transmission request has been received in step S73 (step S73: YES), the process proceeds to step S74.

In step S74, the transmission request recognition unit 253 recognizes the content of the map information transmission request received through the communication unit 220. In addition, the map range extraction unit 254 recognizes and reads a transmission target map range of a map corresponding to the transmission request recognized by the transmission request recognition unit 253. Furthermore, the second communication control unit 252 transmits the map information of the transmission target map range read out as described above to the wrist terminal 1 in the AP mode by Wi-Fi in the communication unit 220. In step S75, the transmission request recognition unit 253 determines whether or not there is a user's operation to end the map transmission processing on the input unit 217. When the transmission request recognition unit 253 determines that there is a user's operation to end the map transmission processing in step S75 (step S75: YES), the map transmission processing is ended. On the other hand, when the transmission request recognition unit 253 determines that there is no user's operation to end the map transmission processing in step S75 (step S75: NO), the process proceeds to step S73. Even when the transmission request recognition unit 253 determines that there is no map information transmission request received through the communication unit 220 in the above step S73, the map transmission processing is ended.

[Operation of Map Information Providing System]

Figure 8:
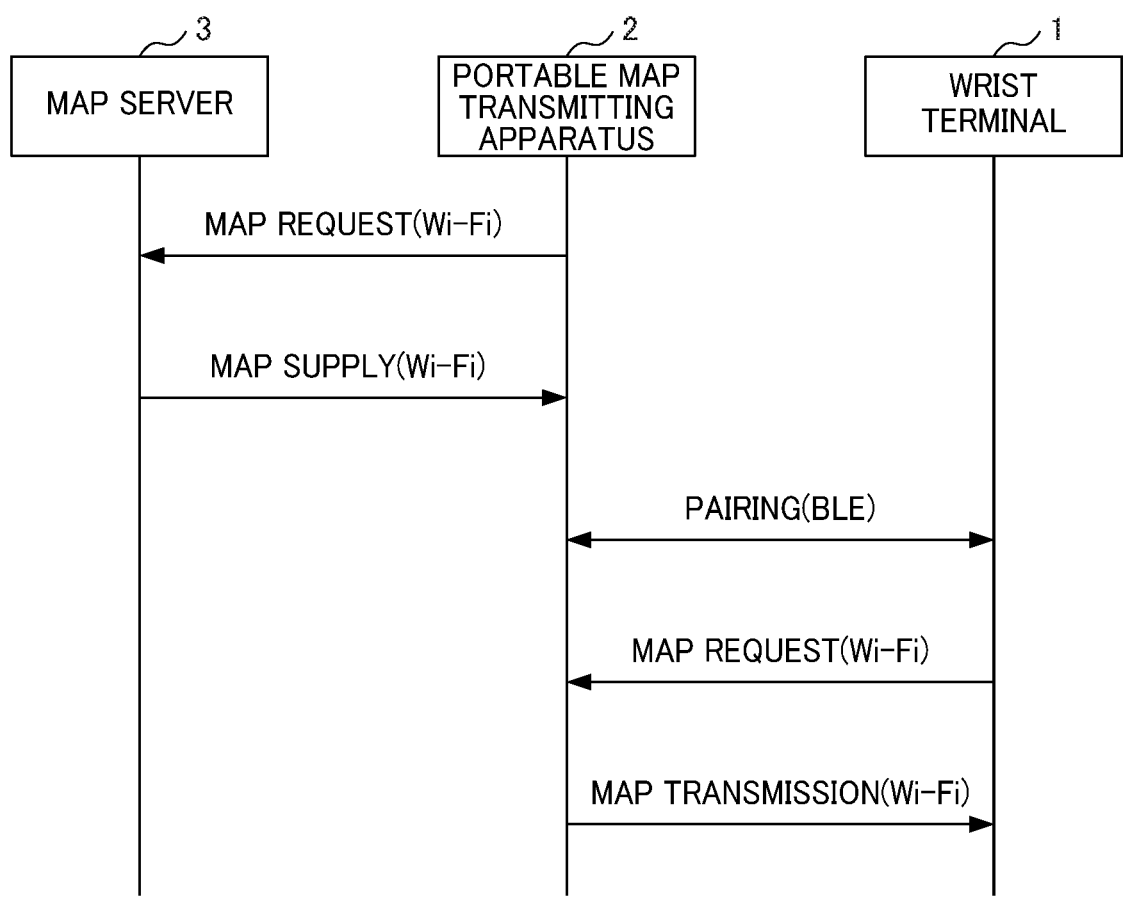
FIG. 8 is a sequence chart illustrating an aspect of transmission and reception of map information in the map information providing system.

Next, an aspect of transmission and reception of map information in a map information providing system as an embodiment of the invention will be described. FIG. 8 is a sequence chart illustrating an aspect of transmission and reception of map information in the map information providing system as an embodiment of the invention. In FIG. 8, the wrist terminal 1, the portable map transmitting apparatus 2, and the map server 3 are components of the map information providing system S illustrated in FIG. 1. The map server 3 supplies a map to the portable map transmitting apparatus 2 through Wi-Fi in response to a map request (map information transmission request) from the portable map transmitting apparatus 2 through Wi-Fi. That is, in this manner, map information (third map information in the first map information) held in the map server 3 is supplied to the portable map transmitting apparatus 2 through the Internet connected by Wi-Fi. In addition, the portable map transmitting apparatus 2 and the wrist terminal 1 can communicate with each other through pairing by BLE communication. In response to the map request from the wrist terminal 1 to the portable map transmitting apparatus 2, map information (second map information in the third map information) that matches the map request is transmitted from the portable map transmitting apparatus 2 to the wrist terminal 1. Communication relevant to the request and supply (transmission) of map information is performed in the AP mode of Wi-Fi.

[Another Aspect of Operation of Wrist Terminal]

Figure 9:
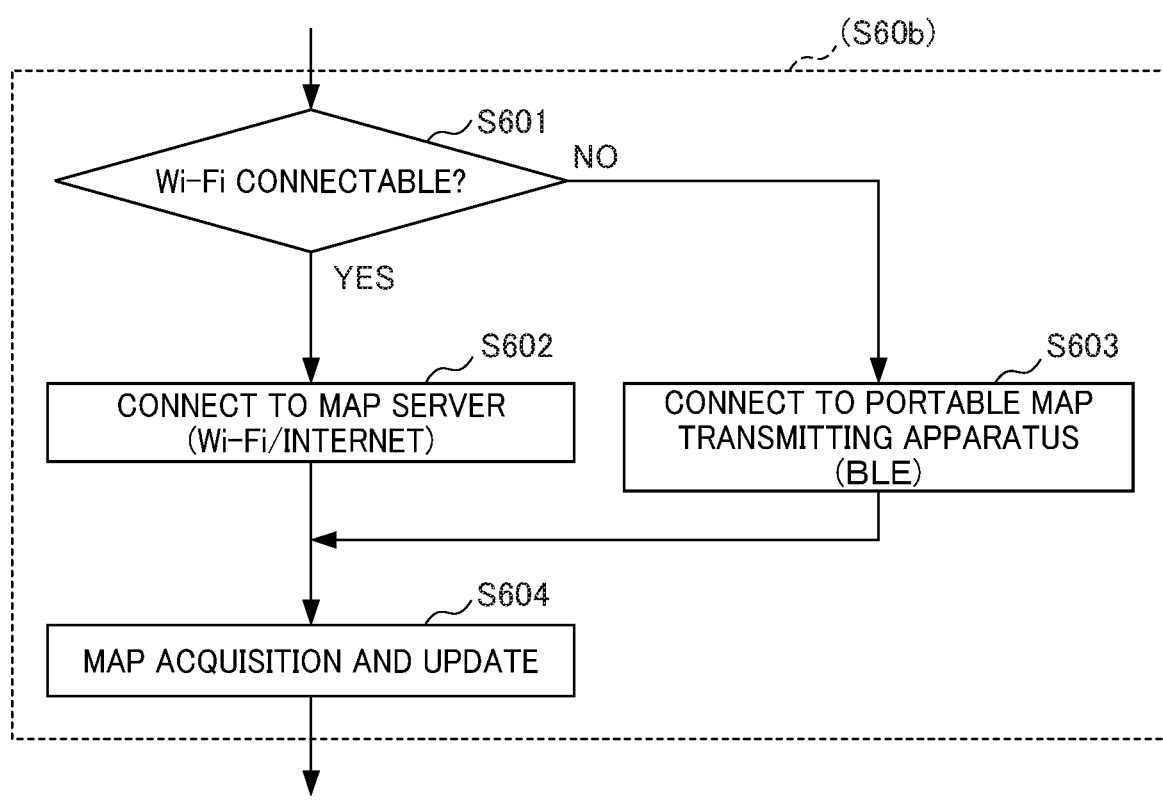
FIG. 9 is a flowchart illustrating the differences from FIG. 6 in another example of the map acquisition and display processing executed by the map information providing apparatus.

Next, another aspect the operation of the wrist terminal will be described. FIG. 9 is a flowchart illustrating the differences from FIG. 6 in another example of the map acquisition and display processing executed by the map information providing apparatus. As in the example illustrated in FIG. 6, the map information providing apparatus is the wrist terminal 1, and the map acquisition and display processing is executed by the control unit 11. In FIG. 9, the map acquisition and update processing (step S60b) that is processing for the acquisition of map information from the outside and update processing on the held map information is another aspect of the above-described map acquisition and update processing (step S60a) in FIG. 6.

When the map display possibility determination unit 55 determines that the predetermined range centered on the current position of the wrist terminal 1 deviates from the displayable range on the basis of the map information already stored in the removable medium 31 in step S63 of FIG. 6 (step S63: YES), the process proceeds to step S601. In step S601, the communication possibility determination unit 56 (FIG. 4) determines whether or not connection to the Internet through Wi-Fi is possible on the basis of the electric field strength of radio waves received by the antenna 20 and the wireless communication module 21. When the communication possibility determination unit 56 determines that the connection to the Internet through Wi-Fi is possible in step S601 (step S601: YES), the process proceeds to step S602.

On the other hand, when the communication possibility determination unit 56 determines that the connection to the Internet through Wi-Fi is not possible in step S601 (step S601: NO), the process proceeds to step S603.

In step S602, the second communication control unit 52 controls communication by Wi-Fi in the wireless communication module 21 to connect to the map server 3 on the Internet. After the connection, the process proceeds to step S604.

In step S603, the first communication control unit 51 controls communication by BLE in the wireless communication module 21 to acquire map information from the portable map transmitting apparatus 2 having pairing established in step S61 of FIG. 6 by BLE.

In step S604, as in step S65 of FIG. 6, the map update control unit 57 downloads the map information from the map server 3 through the Internet connected in step S602, and updates the map information already stored in the removable medium 31.

Alternatively, in step S604, in the setting state in step S603, map information is acquired from the portable map transmitting apparatus 2 by BLE, and the map information already stored in the removable medium 31 is updated with the acquired map information.

After step S604, the process proceeds to step S66 in FIG. 6.

[Another Aspect of Operation of Map Information Providing System]

Next, another aspect of transmission and reception of map information in a map information providing system as an embodiment of the invention will be described. FIG. 10 is a sequence chart illustrating another aspect of transmission and reception of map information in the map information providing system. The sequence chart in FIG. 10 corresponds to the flowchart illustrated in FIG. 9.

In FIG. 10, the wrist terminal 1, the portable map transmitting apparatus 2, and the map server 3 are components of the map information providing system S illustrated in FIG. 1.

The map server 3 supplies a map to the portable map transmitting apparatus 2 through Wi-Fi in response to a map request (map information transmission request) from the portable map transmitting apparatus 2 through Wi-Fi. That is, in this manner, map information (third map information in the first map information) held in the map server 3 is supplied to the portable map transmitting apparatus 2 through the Internet connected by Wi-Fi.

In addition, the portable map transmitting apparatus 2 and the wrist terminal 1 can communicate with each other through pairing by BLE communication. When there is a map request from the wrist terminal 1 to the outside, if it is possible to connect to the Internet by Wi-Fi, a connection is made from the wrist terminal 1 to the map server 3 on the Internet by Wi-Fi. By this connection, the map information held in the map server 3 is downloaded to the wrist terminal 1 through the Internet and Wi-Fi.

On the other hand, when there is a map request from the wrist terminal 1 to the outside, if it is not possible to connect to the Internet by Wi-Fi, a map request is issued from the wrist terminal 1 to the portable map transmitting apparatus 2 by BLE communication. In response to the map request, map information (second map information in the third map information) is transmitted from the portable map transmitting apparatus 2 to the wrist terminal 1 by BLE communication.

In addition, in a case where the wrist terminal 1 is connectable to the Internet by Wi-Fi and the wrist terminal 1 is connectable to the portable map transmitting apparatus 2 by BLE communication, for example, the wrist terminal 1 preferentially acquires the map information from the portable map transmitting apparatus 2. Only in a case where the wrist terminal 1 makes a request for map information beyond the map information range stored in the portable map transmitting apparatus 2, the wrist terminal 1 may download the map information from the map server 3 on the Internet by Wi-Fi. With this configuration, it is possible to significantly reduce the data transfer by communication with relatively high power consumption, such as Wi-Fi, and accordingly to reduce the power consumption of the wrist terminal 1.

The wrist terminal 1 configured as described above includes the wireless communication module 21, the first communication control unit 51, the second communication control unit 52, the map display possibility determination unit 55, and the map update control unit 57. The wireless communication module 21 acquires the second map information of a map range, which is narrower than the first map information held in the map server 3, from the map server 3. The wireless communication module 21 communicates with the portable map transmitting apparatus 2 that acquires the third map information of a map range, which is wider than second map information, from the map server 3. The map display possibility determination unit 55 determines whether or not it is possible to provide predetermined map information corresponding to the predetermined position information on the basis of the second map information. In a case where the map display possibility determination unit 55 determines that it is not possible to provide predetermined map information, the first communication control unit 51 and the second communication control unit 52 control the wireless communication module 21 so as to receive map information based on the third map information from the portable map transmitting apparatus 2. The map update control unit 57 updates the second map information on the basis of the map information based on the third map information received by the first communication control unit 51 and/or the second communication control unit 52. In this manner, the wrist terminal 1 can provide the user with a map of a range beyond the map range that the wrist terminal 1 itself can hold at a time. Therefore, even in an environment in which connection to the mobile communication network is difficult or impossible, it is possible to provide map information beyond the range held in the wrist terminal 1 in advance.

The wrist terminal 1 includes the communication possibility determination unit 56. The wireless communication module 21 communicates with the map server 3 through the Internet. The communication possibility determination unit 56 determines whether or not the second communication control unit 52 can communicate with the map server 3 through the Internet. In a case where the map display possibility determination unit 55 determines that it is not possible to provide predetermined map information and the communication possibility determination unit 56 determines that communication with the map server 3 through the Internet is possible, the first communication control unit 51 and the second communication control unit 52 control the wireless communication module 21 so as to receive map information based on the first map information from the map server 3, and the map update control unit 57 updates the second map information based on the first map information received by the second communication control unit 52. In addition, in a case where the map display possibility determination unit 55 determines that it is not possible to provide predetermined map information and the communication possibility determination unit 56 determines that communication with the map server 3 through the Internet is not possible, the first communication control unit 51 and the second communication control unit 52 control the wireless communication module 21 so as to receive map information based on the third map information from the portable map transmitting apparatus 2, and the map update control unit 57 updates the second map information based on the third map information received by the first communication control unit 51. As a result, even under the conditions in which communication with the map server 3 through the Internet is not possible, it is possible to acquire map information from the portable map transmitting apparatus 2 and provide the map to the user.

The third map information is map information of a range narrower than the map range of the first map information and map information of a range wider than the map range of the second map information. In this manner, the wrist terminal 1 can acquire map information of a map range, which is wider than the second map range that the wrist terminal 1 itself can hold at a time, from the portable map transmitting apparatus 2 that holds the third map information or the map server 3 that holds the first map information, and can provide the map to the user.

In a case where the map display possibility determination unit 55 determines that it is not possible to provide predetermined map information at a timing at which no map information has been provided to the user, the first communication control unit 51 and the second communication control unit 52 control the wireless communication module 21 so as to receive map information based on the third map information from the portable map transmitting apparatus 2. In this manner, in a case where there is a request to display predetermined map information, it is possible to promptly display the map.

The map update control unit 57 updates the second map information on the basis of the map information received by the wrist terminal 1 while maintaining the data capacity of the second map information before the wrist terminal 1 newly receives map information. Therefore, it is possible to update the held map information within a limited storage capacity and to provide a map of a wider map range to the user.

The portable map transmitting apparatus 2 is a smartphone. Therefore, by installing an application program functioning similarly to the dedicated portable map transmitting apparatus 2 on the smartphone, it is possible to transmit the map information to the wrist terminal 1 by using a known apparatus that is widely used.

The wrist terminal 1 is a wearable apparatus. This makes it possible to perform map display of an extensive map range beyond the map display capability of a single wearable apparatus.

In addition, the portable map transmitting apparatus 2 configured as described above includes the communication unit 220, drive 221, the map information storage unit 271, the first communication control unit 251, the second communication control unit 252, and the map range extraction unit 254. The communication unit 220 or the drive 221 acquires map information from an external map information source in which the first map information is stored. The communication unit 220 communicates with a map information providing apparatus that provides the user with the second map information of a map range narrower than the map range of the first map information. The map information storage unit 271 stores the third map information that is acquired by the communication unit 220 or the drive 221 and that is wider than the map range of the second map information and within the map range of the first map information. The first communication control unit 251 and the second communication control unit 252 control the communication unit 220 so as to supply map information, which is based on the third map information stored in the map information storage unit 271, to the map information providing apparatus through the communication unit 220. In this manner, the portable map transmitting apparatus 2 can supply map information of a portion corresponding to the second map information of a map range matching the data storage capacity of the wrist terminal 1, in the third map information of a map range wider than the map range of the second map information held in the portable map transmitting apparatus 2 itself, to the wrist terminal 1. Therefore, even in an environment in which connection to the mobile communication network is difficult or impossible, it is possible to provide map information beyond the range held in the wrist terminal 1 in advance.

The map range extraction unit 254 extracts map information of a map range corresponding to the request of the wrist terminal 1, in the third map information stored in the map information storage unit 271, in response to the request of the wrist terminal 1, and the first communication control unit 251 and the second communication control unit 252 transmit the extracted map information to the wrist terminal 1 through the communication unit 220. As a result, on the wrist terminal 1 side, map information of the map range beyond the range that the wrist terminal 1 holds at a time can be acquired from the portable map transmitting apparatus 2, and the held map information can be updated and provided to the user.

It should be noted that the present invention is not to be limited to the aforementioned embodiments, and that modifications, improvements, etc. within a scope that can achieve the objects of the present invention are also included in the present invention.

In the embodiment described above, the portable map transmitting apparatus 2 may be a dedicated apparatus capable of performing Wi-Fi and BLE communication. However, for example, an application program functioning similarly to the portable map transmitting apparatus 2 may be installed on the smartphone to realize the function of the portable map transmitting apparatus 2. In this case, since the function of the image capture unit 216 illustrated by the broken line in FIG. 3 is mounted on a normal smartphone, not only the map information but also capture information can be supplied to the wrist terminal 1. In addition, communication between the portable map transmitting apparatus 2 and the wrist terminal 1 is not limited to BLE, and it is needless to say that the portable map transmitting apparatus 2 and the wrist terminal 1 may communicate with each other by other wireless communication, such as Bluetooth (registered trademark).

In addition, in the embodiment described above, the portable map transmitting apparatus 2 may store the map information, which is downloaded from the map server 3 through the communication unit 220 of the portable map transmitting apparatus 2, in the removable medium 231. However, in a state in which the removable medium 231 is attached to another apparatus, such as a personal computer, map information may be downloaded from the map server 3 and stored in the removable medium 231. Then, the removable medium 231 may be attached to the drive 221 of the portable map transmitting apparatus 2. In this case, the map information can be stored in the removable medium 231 with high efficiency by making full use of the capability of another apparatus, such as a personal computer with a relatively high communication speed.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. A map information providing apparatus comprising:
a processor; and
a memory,
wherein the processor executes a program stored in the memory to perform operations comprising:
acquiring second map information of a second map range from an external apparatus, wherein the external apparatus has first map information of a first map range, wherein the second map range is narrower than the first map range;
communicating with a portable map transmitting apparatus having third map information of a third map range wider than the second map range of the second map information;
determining whether or not it is possible to provide predetermined map information corresponding to predetermined position information based on the second map information to the map information providing apparatus;
controlling the communication with the portable map transmitting apparatus so as to receive the third map information from the portable map transmitting apparatus in a case where it is determined that it is not possible to provide the predetermined map information to the map information providing apparatus; and
updating the second map information based on the third map information received by the communication with the portable map transmitting apparatus and acquiring the predetermined map information from the updated second map information.

2. The map information providing apparatus according to claim 1, wherein the third map information of the portable map transmitting apparatus is acquired from the external apparatus.

3. The map information providing apparatus according to claim 1, wherein the processor is further configured to
determine whether or not communication with the external apparatus is possible,
control the communication with the external apparatus so as to receive the first map information from the external apparatus in a case where it is determined that it is not possible to provide the predetermined map information to the map information providing apparatus and it is determined that the communication with the external apparatus is possible, and
update the second map information based on the first map information, which is received by the communication with the external apparatus.

4. The map information providing apparatus according to claim 1, wherein the processor is further configured to
determine whether or not communication with the external apparatus is possible,
control the communication with the portable map transmitting apparatus so as to receive the third map information from the portable map transmitting apparatus in the case where it is determined that it is not possible to provide the predetermined map information to the map information providing apparatus and it is determined that the communication with the external apparatus is not possible, and
update the second map information based on the third map information received by the communication with the portable map transmitting apparatus.

5. The map information providing apparatus according to claim 3, wherein the processor is further configured to
control the communication with the portable map transmitting apparatus so as to receive the third map information from the portable map transmitting apparatus in the case where it is determined that it is not possible to provide the predetermined map information to the map information providing apparatus and it is determined that the communication with the external apparatus is not possible, and
update the second map information based on the third map information received by communication with the portable map transmitting apparatus.

6. The map information providing apparatus according to claim 1, wherein the processor is further configured to
control the communication with the portable map transmitting apparatus so as to receive the third map information from the portable map transmitting apparatus regardless of whether the communication with the external apparatus is possible or not, and
update the second map information based on the third map information received by the communication with the portable map transmitting apparatus.

7. The map information providing apparatus according to claim 1, wherein the third map range is narrower than the first map range and wider than the second map range.

8. The map information providing apparatus according to claim 3, wherein the third map range is narrower than the first map range and wider than the second map range.

9. The map information providing apparatus according to claim 4, wherein the third map range is narrower than the first map range and wider than the second map range.

10. The map information providing apparatus according to claim 1, wherein the processor is further configured to control the communication with the portable map transmitting apparatus so as to receive the third map information from the portable map transmitting apparatus in the case where it is determined that it is not possible to provide the predetermined map information at a timing at which the predetermined map information has not been provided to a user.

11. The map information providing apparatus according to claim 1, wherein the processor is further configured to update the second map information based on the third map information received by the map information providing apparatus while maintaining a data capacity of the second map information before the map information providing apparatus receives new map information.

12. The map information providing apparatus according to claim 1, wherein the portable map transmitting apparatus is a smartphone.

13. The map information providing apparatus according to claim 1, wherein the map information providing apparatus is a wearable apparatus.

14. A portable map transmitting apparatus comprising:
a processor; and
a memory,
wherein the processor executes a program stored in the memory to perform operations comprising:
acquiring third map information of a third map range from an external apparatus, wherein the external apparatus stores first map information of a first map range;
communicating with a map information providing apparatus that stores second map information of a second map range narrower than the first map range of the first map information, wherein it has been determined that it is not possible to provide predetermined map information corresponding to a predetermined position information based on the second map information to the map information providing apparatus;
storing the third map information, wherein the third map range is wider than the second map range; and
controlling the communication with the map information providing apparatus so that the stored third map information is supplied to the map information providing apparatus to update the second map information, wherein the predetermined map information is acquired from the updated second map information.

15. The portable map transmitting apparatus according to claim 14, wherein in response to a request from the map information providing apparatus, the processor is further configured to extract fourth map information of fourth map range corresponding to the request from the stored third map information and transmit the extracted fourth map information to the map information providing apparatus through the communication.

16. The portable map transmitting apparatus according to claim 14, wherein the third map range is narrower than the first map range.

17. A map information providing system comprising:
an external apparatus having first map information of a first map range;
a map information providing apparatus that acquires second map information of a second map range narrower than the first map range from the external apparatus; and
a portable map transmitting apparatus that acquires third map information of a third map range wider than the second map range from the external apparatus,
the map information providing apparatus and the portable map transmitting apparatus being configured to directly communicate with each other,
the map information providing apparatus comprising:
a processor; and
a memory,
wherein the processor executes a program stored in the memory to perform operations comprising:
determining whether or not predetermined map information corresponding to predetermined position information is provided to the map information providing apparatus;
controlling communication between the map information providing apparatus and the portable map transmitting apparatus, so that the third map information is transmitted from the portable map transmitting apparatus to the map information providing apparatus in a case where it is determined that the predetermined map information is not provided to the map information providing apparatus; and
updating the second map information based on the third map information received through the communication and acquiring the predetermined map information from the updated second map information.

18. A map information providing method executed by a map information providing apparatus including a processor, the map information providing method causing the processor to execute a program stored in a memory to perform operations comprising:
acquiring second map information of a second map range from an external apparatus, wherein the external apparatus has first map information of a first map range, wherein the second map range is narrower than the first map range;
communicating with a portable map transmitting apparatus having third map information of a third map range wider than the second map range;
determining whether or not it is possible to provide predetermined map information corresponding to predetermined position information based on the second map information to the map information providing apparatus;
controlling the communication with the portable map transmitting apparatus so as to receive the third map information from the portable map transmitting apparatus in a case where it is determined that it is not possible to provide the predetermined map information to the map information providing apparatus; and
updating the second map information based on the third map information received by the communication with the portable map transmitting apparatus and acquiring the predetermined map information from the updated second map.

19. A non-transitory computer-readable storage medium storing a program that is executable by a computer that comprises a processor to control a map information providing apparatus, the program being executable to cause the computer to perform operations comprising:
acquiring second map information of a second map range from an external apparatus, wherein the external apparatus has first map information of a first map range, wherein the second map range is narrower than the first map range;
communicating with a portable map transmitting apparatus having third map information of a third map range wider than the second map range;
determining whether or not it is possible to provide predetermined map information corresponding to predetermined position information based on the second map information to the map information providing apparatus;
controlling the communication with the portable map transmitting apparatus so as to receive the third map information from the portable map transmitting apparatus in a case where it is determined that it is not possible to provide the predetermined map information to the map information providing apparatus; and
updating the second map information based on the third map information received by the communication with the portable map transmitting apparatus and acquiring the predetermined map information from the updated second map information.

* * * * *